S. ROSENTHAL.
COLLAPSIBLE RECEPTACLE FOR CARRYING LUNCHES AND FOR SIMILAR PURPOSES.
APPLICATION FILED SEPT. 26, 1913.

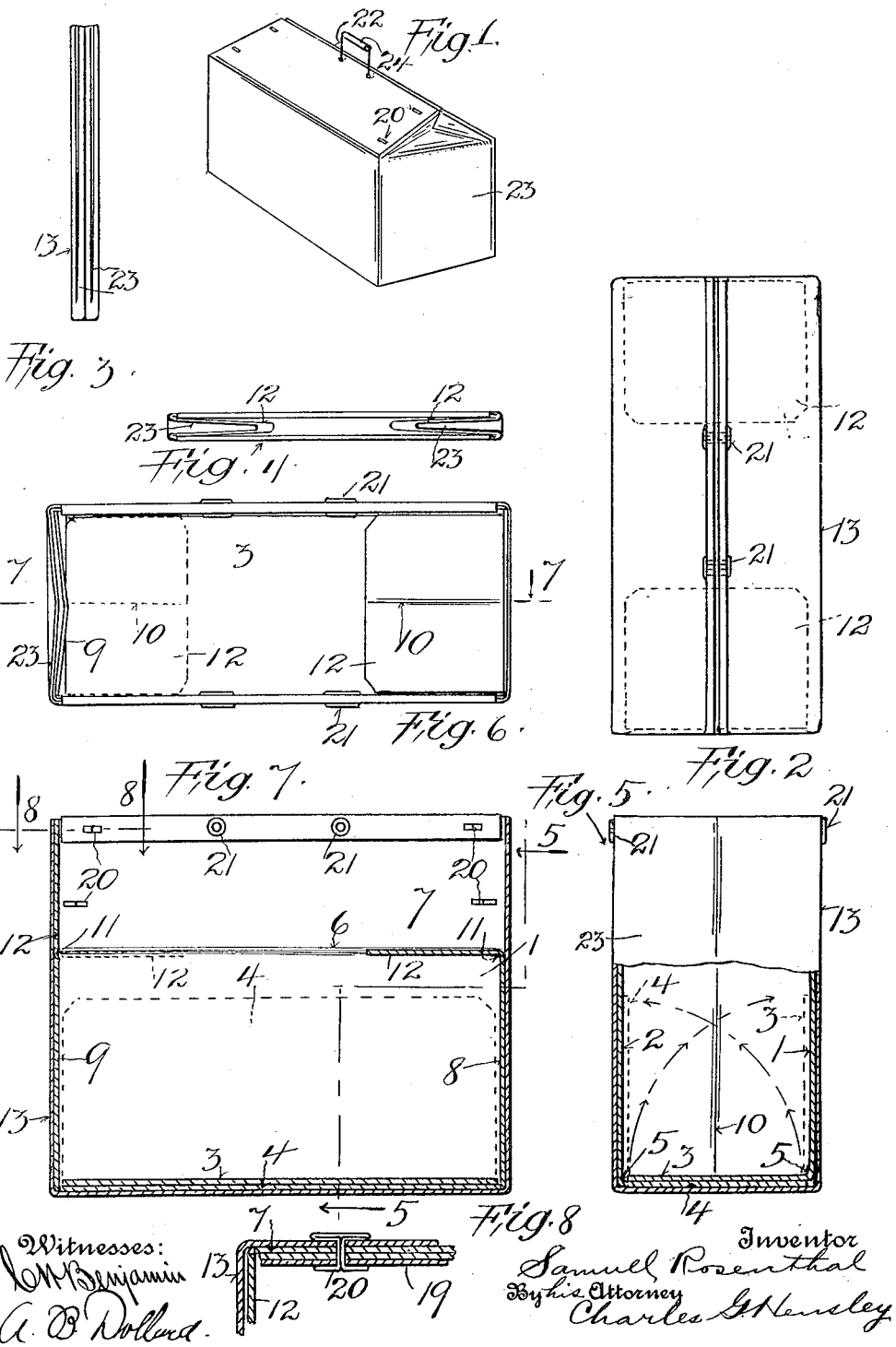

1,128,521.

Patented Feb. 16, 1915.

2 SHEETS—SHEET 2.

UNITED STATES PATENT OFFICE.

SAMUEL ROSENTHAL, OF NEW YORK, N. Y.

COLLAPSIBLE RECEPTACLE FOR CARRYING LUNCHES AND FOR SIMILAR PURPOSES.

1,128,521.              Specification of Letters Patent.        Patented Feb. 16, 1915.

Application filed September 26, 1913. Serial No. 791,911.

*To all whom it may concern:*

Be it known that I, SAMUEL ROSENTHAL, a citizen of the United States, and a resident of the city, county, and State of New York, have invented certain new and useful Improvements in Collapsible Receptacles for Carrying Lunches and for Similar Purposes, of which the following is a specification.

My invention relates to a receptacle which may be folded up and be carried or shipped in a flat condition or which may be unfolded or extended.

The receptacle is especially suitable for carrying lunches and such like where the receptacle is to be carried in a folded condition at one time and in an unfolded condition, and filled, at another.

The object of my invention is to provide an article of this character which may be manufactured and sold at a very low price, say for a few cents each; although, if desired, it may be made of more durable and more expensive materials and be used for traveling purposes generally.

The object is not only to make a simple article but one which may be very readily changed from folded to unfolded position.

When the receptacle is unfolded and filled, the contents thereof will not be subject to pressure from any tendency of the receptacle to collapse while being carried; so that if foods or other easily crushed articles are carried they will be protected the same as if in a non-collapsible receptacle. The arrangement is such, that when the receptacle is unfolded and extended it will have the appearance of a leather satchel of the general shape of a Gladstone grip.

In the drawings forming part of this application, Figure 1 is a perspective view of a receptacle embodying my invention, in an unfolded or extended condition, Fig. 2 is a plan view thereof, Fig. 3 is an end elevation showing the article in the collapsed or folded condition; Fig. 4 is a plan thereof, Fig. 5 is a sectional view, taken on the line 5—5 of Fig. 7, with the article unfolded, Fig. 6 is a plan view of the article with the parts in the same position as in Fig. 7, Fig. 7 is a vertical sectional view, taken on the line 7—7 of Fig. 6, Fig. 8 is a sectional view, taken on the line 8—8 of Fig. 7, Fig. 9 is a sectional view, taken on the line 9—9 of Fig. 11, Fig. 10 is a sectional view, taken on the line 10—10 of Fig. 11, Fig. 11 is a side elevation, and, Fig. 12 is a sectional view, taken on the line 12—12 of Fig. 11.

The article consists, primarily, of an inner casing or shell of comparatively stiff material, such as cardboard; and an outer covering or casing, preferably of thin and flexible material which will crease and fold at suitable locations in accordance with the folding of the inner casing along its edges.

The inner member or case 1 is here shown as consisting of the side walls 1, 2; and bottom members 3, 4, which may fold in relation to the sides along their meeting edges 5; the material being sufficiently soft to permit of this. The sides 1, 2 preferably extend the whole depth of the receptacle; and they are preferably scored along the lines 6, each the same distance from the bottom, so that the upper portions 7 of the opposite sides may be bent inwardly to bring their top edges together, as shown in Figs. 1 and 2; while the remainder or lower portion of the sides stand upright and parallel. The scorings 6 also permit the sides to be flattened when the article is collapsed.

In addition to the above the inner casing has end walls 8, 9 which are scored vertically at their middle 10; or otherwise made so that the end walls may be collapsed. These end walls are also scored, or otherwise made to bend, along the cross lines 11 so that their upper portions 12 may be bent inwardly to lie horizontally while the remainder of the end walls remain perpendicular.

The above forms the inner or stiffening portion of the article, and over it there is arranged a covering which is made of a more flexible material which will conform to the shape and appearance of a traveling bag.

I have shown a covering or sheathing 13 which is of comparatively flexible material. This may be made of tough paper, imitation leather, or, if desired it may be made of real leather. The purpose of this covering is to complete the receptacle and to give it the desired external appearance; and it preferably, though not necessarily, entirely incloses the inner shell. It is here shown as being made of one piece of material, though this is not entirely necessary to obtain the desired result. This covering is here shown as being of suitable size to fit around the inner casing and to follow some of the folds thereof. The sheet 13, of a size to fit over the inner casing when the latter is in unfolded position, is here shown as of one piece, which at the opposite side edges 14, 15 is folded in upon itself and secured to the inner casing. For instance, it is folded inwardly from one end 14 to form a triangular inturned fold 16 which lies between the exposed portion 18 of the outer casing and the side wall of the inner casing. The sheet 13 is also folded inwardly from the opposite end 15 of the article to form a triangular fold 17 which lies between the outer, exposed portion 18 and the inner casing; and this fold partly overlaps the fold 16. Both sides of the article are alike, so that the above description applies to each.

The top of the outer casing is turned over the top edge of the inner casing at 19 and both casings are secured together. For this purpose, preferably the staples 20 are passed through the outer and inner casings and through the turned under edges 19; this being the case at each side of the article. I have also shown eyelets 21 which pass through the outer and inner casings near the top; and they also pass through the turned in and overlapping folds 16, 17, securing the various parts together and providing means for the attachment of the handle 22.

When the article is to be shipped, carried or kept in stock it may be placed in collapsed condition, so that it will occupy very little space and be easy to carry or to ship in quantities. For this purpose the receptacle will be folded as shown in Figs. 3 and 4. In this position the end walls 8, 9, are doubled along their vertical line 10, so that the opposite halves of these walls lie folded one against the other. Thus the opposite side walls will lie against, or nearly against, each other so that the thickness of the collapsed receptacle will be only about equal to the combined thicknesses of the various materials of which it is composed. In this condition of the receptacle the bottom members 3, 4 will each lie vertically and against the respective sides of the receptacle, i. e., against the side walls 1, 2, of the inner casing; and the members 12 will stand vertically. As the outer casing 13 is flexible it will be folded inwardly between the upstanding bottom members 3, 4, and the side walls. Likewise, the end portions 23 will be folded in between the folded halves of the end members 8, 9. In this condition the article will be very compact.

When the receptacle is to be filled, the sides are first drawn apart. This will unfold or flatten the end walls 8, 9 and, of course, will draw out the ends 23 of the outer and flexible casing. First one bottom member 4 is turned down from the vertical to the horizontal position; and then the other one 3, is likewise turned down to lie over the first one, as shown in Fig. 6. The lateral limit of the receptacle is now fixed, because the latter can not spread owing to the outer casing; and it can not collapse because of the horizontally lying bottom members 3, 4. The foods or other things to be carried are now put into the inner casing to rest upon the bottom. When the receptacle is filled, say to the level of the lines 11, the flaps 12 of the end members are turned down from the vertical to the horizontal position, as shown in Fig. 8, so that they lie over the contents. The upper edges of the sides are then brought together, as shown in Figs. 1 and 2, and they may be secured together by passing the ends of a wire 22 through the eyelets 21. If the wire 22, as shown in the drawings, is provided with a handle 24 the parts will serve as a means for keeping the receptacle closed and also as a means for carrying it.

As previously stated, the lower portion of the receptacle is prevented from collapsing and from compressing the contents by means of the bottom members 3, 4, which act as spreaders to keep the sides properly spaced apart. The flaps 12 will also act as spreaders to keep the sides apart at the upper portion of the receptacle.

As the sides are not altogether inflexible they will, when the upper edges are secured together, incline at an angle toward each other, as shown in Figs. 1 and 2, and this, together with the other parts, will give to the receptacle the general shape and appearance of an ordinary satchel or Gladstone bag.

It will be apparent that when the upper edges are released and the contents removed, the receptacle may be again folded by turning up the bottom members 3, 4 and the end flaps 12; and by pressing the sides together.

The present article is very inexpensive, because the inner casing may be made of inexpensive card board and the outer casing of a paper or other material having a surface resembling leather, if desired. The article is very convenient, and is very easily convertible from the collapsed to the extended condition and vice versa; and, furthermore, the receptacle is held in extended position by its own and foldable parts, so that the contents is not pressed or crushed by any tendency of the receptacle to collapse.

Having described my invention, what I claim is:

1. A device of the class described, comprising a receptacle having an inner casing of stiff material, and an outer casing, said inner casing having side walls and collapsible end walls, bottom members arranged to be placed upright in the receptacle to permit said end walls to be collapsed and adapted to be placed crosswise of the receptacle to hold said end walls extended, said end walls having upper flaps adapted to be placed upright to permit the receptacle to be collapsed and to be placed horizontally to hold the side walls apart at their upper portions.

2. A device of the class described, comprising a receptacle having an inner casing of stiff material, and an outer casing, said inner casing having side walls and collapsible end walls, swinging bottom members arranged to be placed upright in the receptacle to permit the end walls to be collapsed, and adapted to be placed crosswise of the receptacle to hold the end walls extended, said end walls having upper flaps adapted to be placed upright to permit the receptacle to be collapsed and to be placed horizontally to hold the side walls apart at their upper portions, said side walls being foldable inwardly above the said flaps when the latter are in their horizontal position, to close the top of the receptacle.

Signed in the city, county and State of New York this 24th day of September, 1913.

SAMUEL ROSENTHAL.

Witnesses:
HARRY SCHWARTZ,
S. ZINOVARY.

Copies of this patent may be obtained for five cents each, by addressing the "Commissioner of Patents, Washington, D. C."